United States Patent
Chen

(10) Patent No.: US 10,728,098 B2
(45) Date of Patent: Jul. 28, 2020

(54) CONNECTIONS AND ACCESSES FOR HIERARCHICAL PATH COMPUTATION ELEMENT (PCE)

(71) Applicant: Futurewei Technologies, Inc., Plano, TX (US)

(72) Inventor: Huaimo Chen, Bolton, MA (US)

(73) Assignee: Futurewei Technologies, Inc., Plano, TX (US)

( * ) Notice: Subject to any disclaimer, the term of this patent is extended or adjusted under 35 U.S.C. 154(b) by 153 days.

(21) Appl. No.: 15/602,243

(22) Filed: May 23, 2017

(65) Prior Publication Data

US 2018/0013631 A1    Jan. 11, 2018

Related U.S. Application Data

(60) Provisional application No. 62/359,077, filed on Jul. 6, 2016.

(51) Int. Cl.
*H04L 12/24* (2006.01)
*H04L 12/715* (2013.01)
(Continued)

(52) U.S. Cl.
CPC .............. *H04L 41/12* (2013.01); *H04L 43/08* (2013.01); *H04L 45/42* (2013.01); *H04L 45/02* (2013.01); *H04L 45/04* (2013.01)

(58) Field of Classification Search
CPC ......... H04L 41/12; H04L 43/08; H04L 45/02; H04L 45/04; H04L 45/24; H04L 67/327; H04L 45/50
See application file for complete search history.

(56) References Cited

U.S. PATENT DOCUMENTS

2008/0095176 A1* 4/2008 Ong ........................ H04L 45/00
                                                              370/400
2010/0265943 A1* 10/2010 Dong ...................... H04L 45/04
                                                              370/389
(Continued)

FOREIGN PATENT DOCUMENTS

CN        102014073 A      4/2011
CN        102238443 A1     11/2011
(Continued)

OTHER PUBLICATIONS

Zhang, F., et al, "Extensions to Path Computation Element Communication Protocol (PCEP) for Hierarchical Path computation Elements (PCE)," XP015078472, draft-zhang-pce-hierarchy-extensions-01.txt, Oct. 13, 2011, pp. 1-19.

(Continued)

*Primary Examiner* — Edan Orgad
*Assistant Examiner* — Nourali Mansoury
(74) *Attorney, Agent, or Firm* — Conley Rose, P.C.

(57) ABSTRACT

Disclosed herein are various embodiments for constructing an abstract domain topology. In one embodiment, a Path Computation Element (PCE) is configured as a parent PCE to at least one child PCE. Each of the child PCEs is responsible for providing path computational services for a domain. Communication is established between the parent PCE and the at least one child PCE. The parent PCE receives from each of its child PCEs domain connection information corresponding to the domain of each child PCE. The parent PCE builds and maintains an abstract domain topology based on the domain connection information that it receives from its child PCEs. In one embodiment, the domain connection information is communicated from the child PCE to the parent PCE by adding a new notification-type (NT) and notification-value (NV) to a notification object in a Path (Continued)

Computation Element Communication Protocol (PCEP) notification message.

17 Claims, 11 Drawing Sheets

(51) Int. Cl.
  *H04L 12/26* (2006.01)
  *H04L 12/717* (2013.01)
  *H04L 12/751* (2013.01)

(56) References Cited

U.S. PATENT DOCUMENTS

| | | | | |
|---|---|---|---|---|
| 2012/0224506 A1* | 9/2012 | Gredler | ............... | H04L 45/04 370/254 |
| 2012/0308225 A1 | 12/2012 | Long et al. | | |
| 2013/0070752 A1* | 3/2013 | Dhruv | ............... | H04L 45/44 370/351 |
| 2015/0163125 A1 | 6/2015 | Caviglia et al. | | |
| 2016/0043934 A1* | 2/2016 | Ubaldi | ............... | H04L 45/22 370/390 |
| 2017/0257307 A1 | 9/2017 | Lu et al. | | |

FOREIGN PATENT DOCUMENTS

| | | | |
|---|---|---|---|
| CN | 102742224 | A | 10/2012 |
| CN | 103379032 | A | 10/2013 |
| CN | 104365072 | A | 2/2015 |
| CN | 104753778 | A | 7/2015 |
| CN | 105634941 | A | 6/2016 |
| EP | 3076610 | A1 | 10/2016 |
| WO | 2015051839 | A1 | 4/2015 |
| WO | 2015135569 | A1 | 9/2015 |
| WO | 2015196631 | A1 | 12/2015 |

OTHER PUBLICATIONS

King, D., Ed, et al. "The Application of the Path Computation Element Architecture to the Determination of a Sequence of Domains in MPLS and GMPLS," XP015086497, RFC 6805, Nov. 21, 2012, pp. 1-33.
Chen, H., et al, "Connections and Accesses for Hierarchical PCE," XP015114055, draft-chen-pce-h-connect-access-00.txt, Jul. 8, 2016, pp. 1-17.
Foreign Communication From a Counterpart Application, European Application No. 17823662.6, Extended European Search Report dated Mar. 1, 2019, 10 pages.
Bradner, S., et al., "Key words for use in RFCs to Indicate Requirement Levels," RFC 2119, Mar. 1997, 3 pages.
Katz, D., "Traffic Engineering (TE) Extensions to OSPF Version 2," RFC 3630, Sep. 2003, 14 pages.
Li, T., et al., "IS-IS Extensions for Traffic Engineering," RFC 5305, Oct. 2008, 17 pages.
Chen, M., et al., "ISIS Extensions in Support of Inter-Autonomous System (AS) MPLS and GMPLS Traffic Engineering," RFC 5316, Dec. 2008, 19 pages.
Chen, M., et al., "OSPF Extensions in Support of Inter-Autonomous System (AS) MPLS and GMPLS Traffic Engineering," RFC 5392, Jan. 2009, 17 pages.
Vasseur, JP., Ed., et al., "Path Computation Element (PCE) Communication Protocol (PCEP)," RFC 5440, Mar. 2009, 87 pages.
King, D., Ed, et al., "The Application of the Path Computation Element Architecture to the Determination of a Sequence of Domains in MPLS and GMPLS," RFC 6805, Nov. 2012, 33 pages.
Gredler, H., et.al., "North-Bound Distribution of Link-State and Traffic Engineering (TE) Information Using BGP," RFC 7752, Mar. 2016, 48 pages. Nourali Mansoury
Machine Translation and Abstract of Chinese Publication No. CN103379032, dated Oct. 30, 2013, 18 pages.
Machine Translation and Abstract of Chinese Publication No. CN105634941, dated Jun. 1, 2016, 17 pages.
Foreign Communication From a Counterpart Application, PCT Application No. PCT/CN2017/092008, English Translation of International Search Report dated Aug. 29, 2017; 4 pages.
Foreign Communication From a Counterpart Application, PCT Application No. PCT/CN2017/092008, English Translation of Written Opinion dated Aug. 29, 2017, 7 pages.
Chen, H., et al., "Connections and Accesses for Hierarchical PCE," draft-chen-pce-h-connect-distrib-00, Jul. 3, 2016, 19 pages.
Chen, H., et al, "PCEP Link State Abstraction," XP015118631, draft-chen-pce-h-connect-access-02, Mar. 13, 2017, pp. 1-17.
Foreign Communication From a Counterpart Application, Chinese Application No. 17823662.6, European Office Actio dated Dec. 3, 2019, 6 pages.
Machine Translation and Abstract of Chinese Publication No. CN102014073, dated Apr. 13, 2011, 18 pages.
Machine Translation and Abstract of Chinese Publication No. CN102742224, dated Oct. 17, 2012, 20 pages.
Foreign Communication From a Counterpart Application, Chinese Application No. 201780039091.1, Chinese Office Action dated Jan. 6, 2020, 9 pages.

\* cited by examiner

410

Inter-Domain Link TLV:
```
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |     412 ~Type (tTBD1)         |           414 ~Length          |
   +-+-+-+-+-+-+-+-+-+-+-+-+-+-+-+-+-+-+-+-+-+-+-+-+-+-+-+-+-+-+-+-+
   |              416 ~Inter-Domain Link Sub-TLVs                  |
   ~                                                               ~
   +-+-+-+-+-+-+-+-+-+-+-+-+-+-+-+-+-+-+-+-+-+-+-+-+-+-+-+-+-+-+-+-+
```

420

Router-ID TLV:
```
   +-+-+-+-+-+-+-+-+-+-+-+-+-+-+-+-+-+-+-+-+-+-+-+-+-+-+-+-+-+-+-+-+
   |  423      Type (tTBD2)~422    |          424 ~Length           |
   +-+-+-+-+-+-+-+-+-+-+-+-+-+-+-+-+-+-+-+-+-+-+-+-+-+-+-+-+-+-+-+-+
   |B|E|I|  426 ~Flags             |                               |
   +-+-+-+-+-+-+-+-+-+-+-+-+-+-+-+-+                               +
   |421  425              428 ~ Router-ID                          ~
   +-+-+-+-+-+-+-+-+-+-+-+-+-+-+-+-+-+-+-+-+-+-+-+-+-+-+-+-+-+-+-+-+
```

430

Access IPv4/IPv6 Address Prefix TLV:
```
   +-+-+-+-+-+-+-+-+-+-+-+-+-+-+-+-+-+-+-+-+-+-+-+-+-+-+-+-+-+-+-+-+
   |   432 ~Type (tTBD3/tTBD4)     |          434 ~Length           |
   +-+-+-+-+-+-+-+-+-+-+-+-+-+-+-+-+-+-+-+-+-+-+-+-+-+-+-+-+-+-+-+-+
   | Prefix Length | IPv4/IPv6 Prefix (variable)~438                ~
   +-+-+-+-+-+-+-+-+-+-+-+-+-+-+-+-+-+-+-+-+-+-+-+-+-+-+-+-+-+-+-+-+
      436
```

FIG. 4

510
Local IPv4 Address with Mask Sub-TLV:
```
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |     512  Type (stTBD1)        |         514  Length           |
   +-+-+-+-+-+-+-+-+-+-+-+-+-+-+-+-+-+-+-+-+-+-+-+-+-+-+-+-+-+-+-+-+
   |                      516  IPv4 Address                        |
   +-+-+-+-+-+-+-+-+-+-+-+-+-+-+-+-+-+-+-+-+-+-+-+-+-+-+-+-+-+-+-+-+
518  Mask Length  |
   +-+-+-+-+-+-+-+-+-+
```
520
Local IPv6 Address with Mask Sub-TLV:
```
   +-+-+-+-+-+-+-+-+-+-+-+-+-+-+-+-+-+-+-+-+-+-+-+-+-+-+-+-+-+-+-+-+
   |     522  Type (stTBD2)        |         524  Length           |
   +-+-+-+-+-+-+-+-+-+-+-+-+-+-+-+-+-+-+-+-+-+-+-+-+-+-+-+-+-+-+-+-+
   |                 526   IPv6 Address (16 bytes)                 |
   ~                                                                ~
   +-+-+-+-+-+-+-+-+-+-+-+-+-+-+-+-+-+-+-+-+-+-+-+-+-+-+-+-+-+-+-+-+
528  Mask Length  |
   +-+-+-+-+-+-+-+-+-+
```

FIG. 5

```
                600
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Reserved 602   |   Flags 604   |     NT 606    |    NV 608   |
+-+-+-+-+-+-+-+-+-+-+-+-+-+-+-+-+-+-+-+-+-+-+-+-+-+-+-+-+-+-+-+-+
|                                                                |
~                      Optional TLVs  610                        ~
|                                                                |
+-+-+-+-+-+-+-+-+-+-+-+-+-+-+-+-+-+-+-+-+-+-+-+-+-+-+-+-+-+-+-+-+
```

FIG. 6

```
        700                        702
   <AC Message>  ::= <Common Header>
                704 <NRP>
                706 [<Connection-List>]
                708 [<Access-Address-List>]
   where:
706 <Connection-List> ::= <Connection> 710
                            712 [<Connection-List>] 706
710 <Connection> ::= [<Inter-Domain-Link> | <ABR>] 714
708 <Access-Address-List> ::= <Access-Address> 716
                                  [<Access-Address-List>] 718
```

FIG. 7

```
                810
                 ?
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|W|    Flags    |              Router-ID TLV~814                |
+}-+-+-+-}-+-+-+                                                +
~811       812                                                  ~
+-+-+-+-+-+-+-+-+-+-+-+-+-+-+-+-+-+-+-+-+-+-+-+-+-+-+-+-+-+-+-+-+
|                       Inter-Domain Link TLVs~816              |
~                                                               ~
+-+-+-+-+-+-+-+-+-+-+-+-+-+-+-+-+-+-+-+-+-+-+-+-+-+-+-+-+-+-+-+-+

820
             ?
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|W|    Flags    |             Router-ID TLVs~824                |
+}-+-+-+-}-+-+-+                                                +
~821       822                                                  ~
+-+-+-+-+-+-+-+-+-+-+-+-+-+-+-+-+-+-+-+-+-+-+-+-+-+-+-+-+-+-+-+-+

830
             ?
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|W|    Flags    |          Access IPv4 Prefix TLVs~834          |
+}-+-+-+-}-+-+-+                                                +
~831       832                                                  ~
+-+-+-+-+-+-+-+-+-+-+-+-+-+-+-+-+-+-+-+-+-+-+-+-+-+-+-+-+-+-+-+-+

840
             ?
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|W|    Flags    |          Access IPv6 Prefix TLVs~844          |
+}-+-+-+-}-+-+-+                                                +
~841       842                                                  ~
+-+-+-+-+-+-+-+-+-+-+-+-+-+-+-+-+-+-+-+-+-+-+-+-+-+-+-+-+-+-+-+-+
```

FIG. 8

```
                          900
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Object-Class  |   OT  |Res|P|I|       Object Length (bytes)   |
+-+-+-+-+-+-+-+-+-+-+-+-+-+-+-+-+-+-+-+-+-+-+-+-+-+-+-+-+-+-+-+-+
        902         904   906 908 910              912
//                       (Object body) ~914                    //
|                                                               |
+-+-+-+-+-+-+-+-+-+-+-+-+-+-+-+-+-+-+-+-+-+-+-+-+-+-+-+-+-+-+-+-+
```

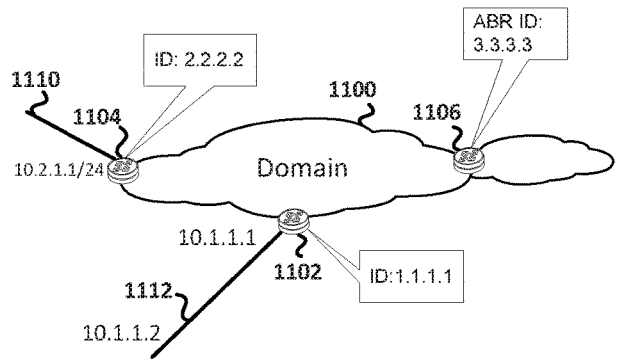
FIG. 11
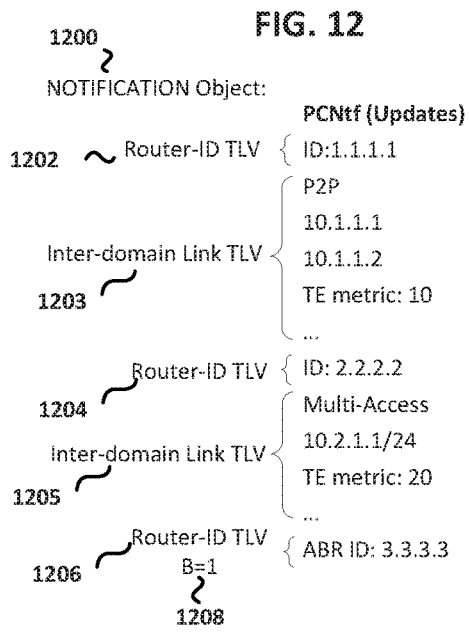
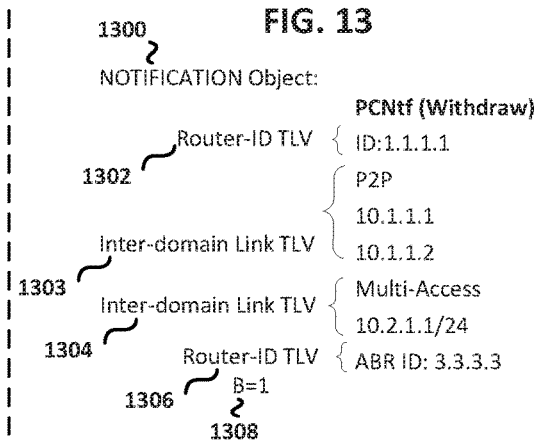

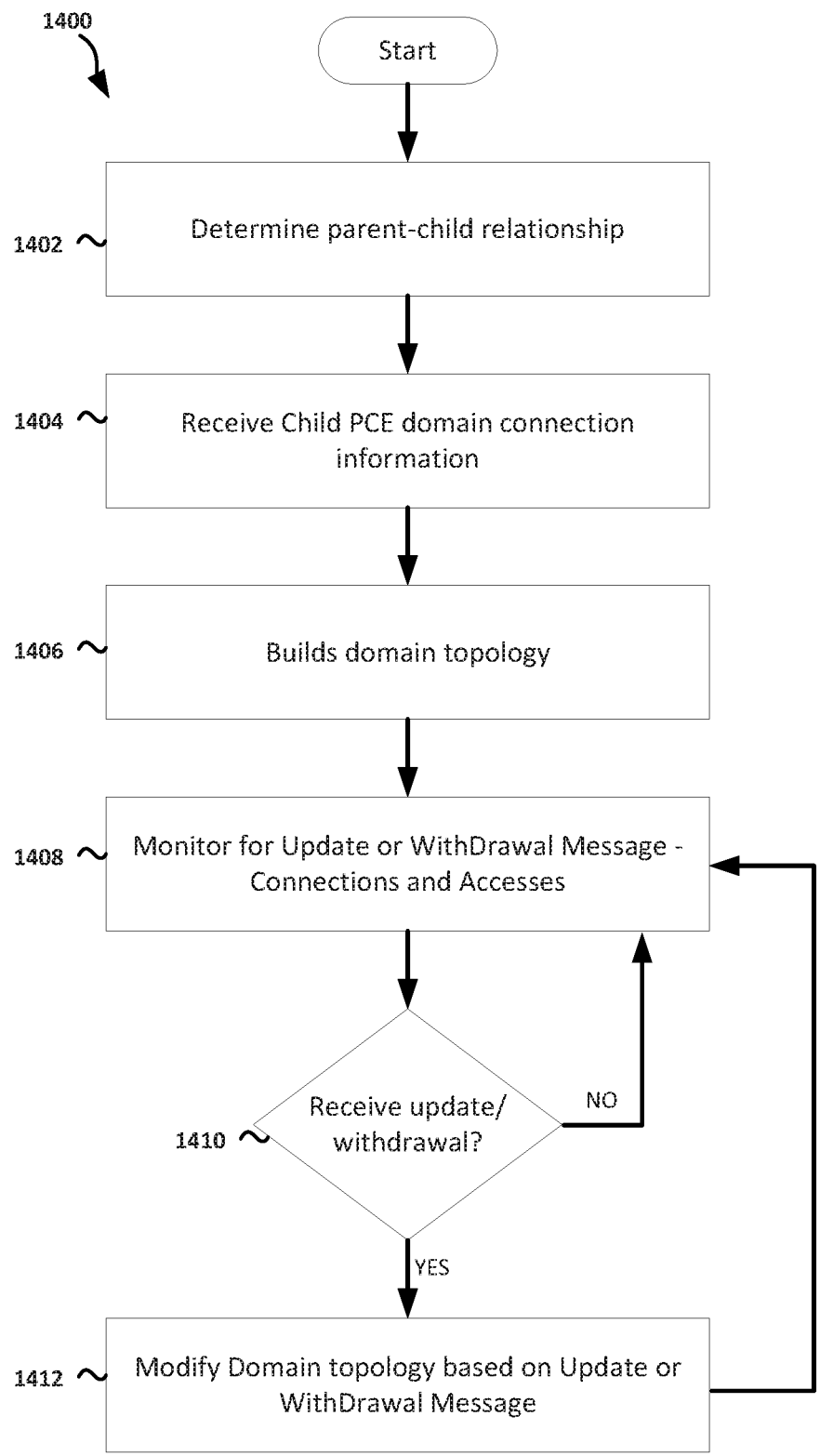

CONNECTIONS AND ACCESSES FOR HIERARCHICAL PATH COMPUTATION ELEMENT (PCE)

CROSS-REFERENCE TO RELATED APPLICATIONS

This application claims priority to U.S. provisional patent application No. 62/359,077 filed Jul. 6, 2016 by Huaimo Chen and titled "Connections and Accesses for Hierarchical Path Computation Element (PCE)," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A Path Computation Element (PCE) is a system component, application, or network node that is capable of determining a suitable route for conveying data between a source and a destination. A PCE enables networks to separate route computations from the signaling of end-to-end connections and from actual packet forwarding. The Path Computation Element Communication Protocol (PCEP) is a special set of rules that allows a Path Computation Client (PCC) to request path computations from a PCE.

SUMMARY

According to one aspect of the present disclosure, there is provided a method for constructing an abstract domain topology. In one embodiment, the method includes configuring a PCE as a parent PCE to at least one child PCE. Each of the child PCEs is responsible for providing path computational services for a domain. The method includes establishing communication between the parent PCE and the at least one child PCE. The parent PCE then receives domain connection information corresponding to the domain of each child PCE. The parent PCE builds and maintains an abstract domain topology based on the domain connection information received from its child PCEs.

According to another aspect of the present disclosure, there is provided a method for constructing an abstract domain topology in which a PCE is configured as a child PCE to a parent PCE. The child PCE establishes communication between the child PCE and the parent PCE. The child PCE sends the domain connection information corresponding to a domain of the child PCE to the parent PCE.

Optionally, in any of the preceding aspects the domain connection information may include a domain identifier of the domain of a child PCE, inter-domain links and area border routers (ABRs) of the domain of the child PCE to adjacent domains, and access points within the domain of the child PCE. The inter-domain links may include point-to-point (P2P) links connecting two autonomous system border routers (ASBRs) in two different domains, and broadcast links connecting multiple ASBRs in a number of domains. The domain connection information for the P2P links may include a link type, a local Internet Protocol (IP) address, a remote IP address, a traffic engineering metric, a maximum bandwidth, a maximum reservable bandwidth, an administrative group, and shared risk link groups (SRLG). The domain connection information for the broadcast links may include a link type, a local IP address with mask length, a traffic engineering metric, a maximum bandwidth, a maximum reservable bandwidth, an administrative group, and SRLG.

Optionally, in any of the preceding aspects the domain connection information for the domain of the child PCE may be communicated by the child PCE to the parent PCE by extending a PCEP notification message to include a new notification-type (NT) and notification-value (NV) of a notification object in the PCEP notification message. In an embodiment, the domain connection information for the domain of the child PCE may be communicated by the child PCE to the parent PCE using a newly defined message format such as the example message format disclosed herein.

Other features of the various embodiments and advantages thereof are described below in the Detailed Description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is a schematic diagram illustrating new Type-Length-Variable (TLV) extensions to protocol messages according to an embodiment of the disclosure.

FIG. 5 is a schematic diagram illustrating new sub-TLVs extensions to protocol messages according to an embodiment of the disclosure.

FIG. 6 is a schematic diagram illustrating a PCEP notification body object according to an embodiment of the disclosure.

FIG. 7 is a schematic diagram illustrating a new message format according to an embodiment of the disclosure.

FIG. 8 is a schematic diagram illustrating a connection and access object according to an embodiment of the disclosure.

FIG. 11 is a schematic diagram illustrating a domain of a child PCE according to an embodiment of the disclosure.

FIG. 12 is a schematic diagram illustrating an update notification object for the domain in FIG. 11 according to an embodiment of the disclosure.

FIG. 13 is a schematic diagram illustrating a withdrawal notification object for the domain in FIG. 11 according to an embodiment of the disclosure.

FIG. 14 is a flowchart illustrating a process performed on a parent PCE according to an embodiment of the disclosure.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In computer networks, computing optimum routes for Label Switched Paths (LSPs) across multiple domains in Multiprotocol Label Switching (MPLS) Traffic Engineering (MPLS-TE) and Generalized Multiprotocol Label Switching (GMPLS) networks presents a problem because no single point of path computation is aware of all of the links and resources in each domain.

The disclosed embodiments address the above problem through the use of a hierarchical PCE architecture. Particularly, the disclosed embodiments enable a parent PCE to build and maintain a hierarchical PCE domain topology based on domain connection information that the parent PCE receives from its child PCEs. As will be further described, the domain connection information includes connections and access points of a child domain. The disclosed embodiments may be implemented by extending existing protocol messages and procedures to include new TLV data encodings and sub-TLVs. The disclosed embodiments may also be implemented by including new NT and NV of a notification object in the PCEP notification message. Additionally, the disclosed embodiments may be implemented by defining a new message format. Advantages of the disclosed embodiments include reducing the overall network capital expense (CapEx) and operating expense (OpEx), increasing the efficiency of network resource usage, facilitating deployment of services, and enabling new features in a simple and efficient manner.

Figure 1:
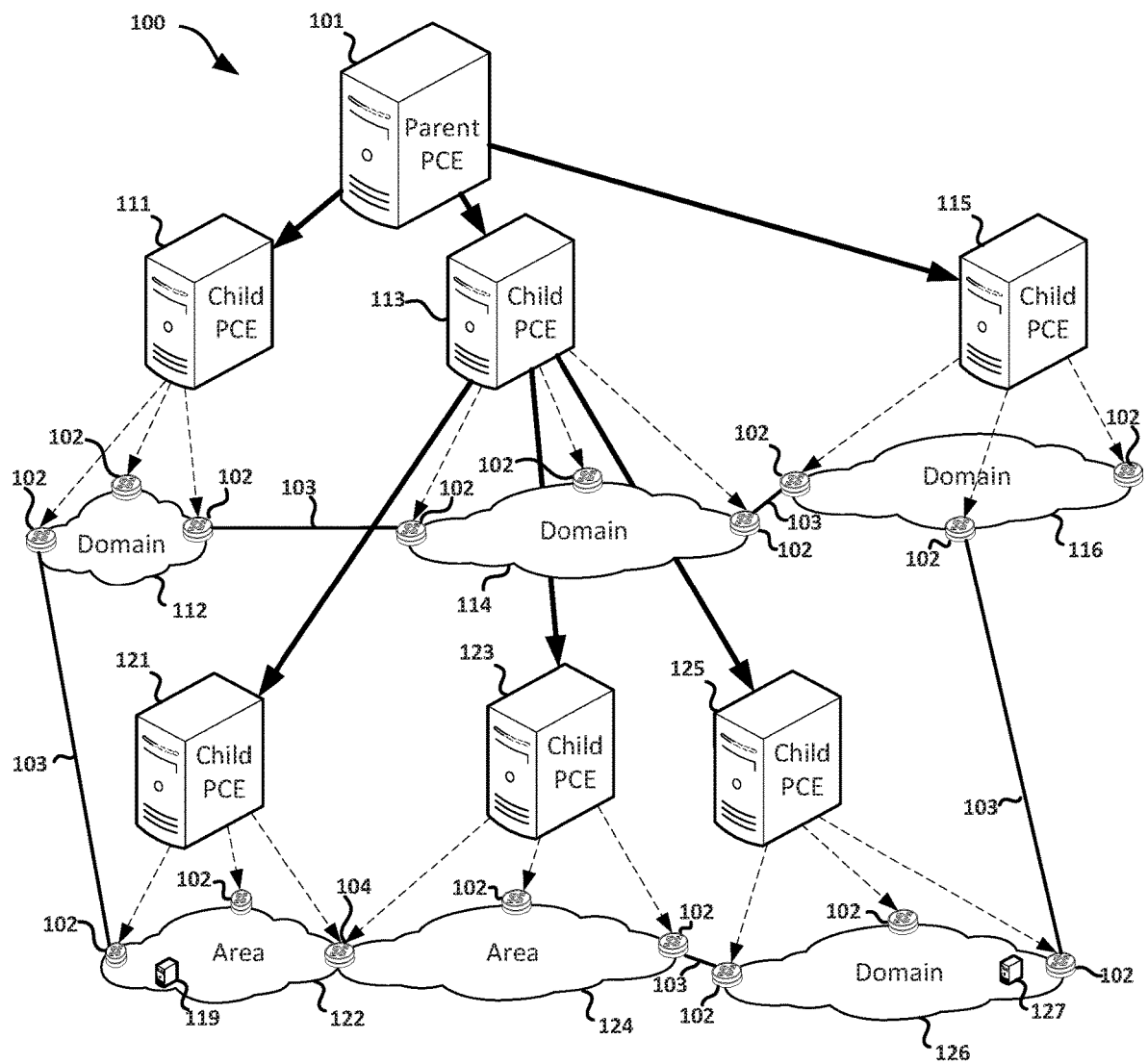
FIG. 1 is a schematic diagram illustrating an abstract hierarchical PCE network architecture according to an embodiment of the disclosure.

FIG. 1 is a schematic diagram illustrating an abstract hierarchical PCE network topology architecture 100 according to an embodiment of the disclosure. In the depicted embodiment, the abstract hierarchical PCE network topology architecture 100 includes a parent PCE 101 at a first or top tier of the abstract hierarchical PCE network topology architecture 100, a first set of child PCEs (child PCE 111, child PCE 113, child PCE 115) at a second tier of the abstract hierarchical PCE network topology architecture 100, and a second set of child PCEs (child PCE 121, child PCE 123, child PCE 125) at a third tier of the abstract hierarchical PCE network topology architecture 100. Although only a certain number of child PCEs are depicted at the second tier and third tier in FIG. 1, the abstract hierarchical PCE network architecture 100 may comprise any number of child PCEs at each of the tiers. Additionally, although only three tier levels are depicted in FIG. 1, the hierarchical PCE network topology architecture 100 may be expanded to include any number of tiers.

In the depicted embodiment, the parent PCE 101, child PCE 111, child PCE 113, and child PCE 115 are configured to establish a parent-child relationship in which the parent PCE 101 is a parent PCE to child PCE 111, child PCE 113, and child PCE 115. In addition, a child PCE may also be configured as a parent PCE to any parent-less child PCE. For instance, in FIG. 1, child PCE 113, child PCE 121, child PCE 123, and child PCE 125 may be configured to establish a parent-child relationship in which child PCE 113 is a parent PCE to child PCE 121, child PCE 123, and child PCE 125.

Each of the child PCEs is associated with a domain and is responsible for providing path computation services for the domain. A domain is defined as a collection of network elements within a common sphere of address management or path computational responsibility. Non-limiting examples of domains include Autonomous Systems (ASes) and Interior Gateway Protocol (IGP) Areas. An AS is a single network or a group of networks that is controlled by a common network administrator (or group of administrators) on behalf of a single administrative entity. An Area is a logical collection of Open Shortest Path First (OSPF) networks, routers, and links that have the same area identification. IGP is a protocol for exchanging routing information between gateways (hosts with routers) within an autonomous network (for example, a system of corporate local area networks). One type of IGP protocol is Intermediate System to Intermediate System (IS-IS), which is designed for use within an administrative domain or network. This is in contrast to exterior gateway protocols, primarily Border Gateway Protocol (BGP), which are used for routing between ASes.

Networks are often constructed from multiple domains. These domains are often interconnected via multiple interconnect points (i.e., boundary nodes). For example, in FIG. 1, boundary nodes 102 may form an inter-domain link 103 between two domains in two different ASes. The boundary nodes 102 may be entry Label Switching Routers (LSRs) or exit LSRs in each domain.

In one embodiment, a particular LSR called an ASBR is used to connect two ASes or an AS to an Area. An ASBR is a router configured to run multiple protocols and serves as a gateway to routers outside the OSPF domain and those operating with different protocols. The ASBR is able to import and translate different protocol routes into OSPF through a process known as redistribution. The ASBR exchanges routing information with routers belonging to other ASes via inter-AS links. In one embodiment, to connect two IGP Areas, a particular LSR called an ABR is utilized. For instance, in FIG. 1, ABR 104 connects Area 122 and Area 124.

As shown in FIG. 1, child PCE 111 is responsible for providing path computational service for Domain 112, child PCE 113 is responsible for providing path computational service for Domain 114, child PCE 115 is responsible for providing path computational service for Domain 116, child PCE 121 is responsible for providing path computational service for Area 122, child PCE 123 is responsible for providing path computational service for Area 124, and child PCE 125 is responsible for providing path computational service for Domain 126. Each of the child PCEs is configured to know the identity of the domains that neighbor its own domain. However, a child PCE only knows the topology of the domain that it serves and does not know the topology of other child domains. The child PCEs are also not aware of the general domain mesh connectivity (i.e., the domain topology map) beyond the connectivity to the immediate neighbor domains of the domain it serves.

As a parent PCE, the parent PCE 101 is adapted to compute an end-to-end path across the plurality of network domains 112, 114, and 116 in conjunction with the respective child PCEs 111, 113, and 115. Similarly, because child PCE 113 is also configured as a parent PCE to child PCEs 121, 123, and 125, the child PCE 113 is adapted to compute an end-to-end path across Area 122, Area 124, and Domain 126 in conjunction with the respective child PCEs 121, 123, and 125.

In accordance with an embodiment, the parent PCE 101 maintains a domain topology of the domains (e.g., Domains 112, 114, and 116) and may be sub-domains (e.g., Area 122, Area 124, and Domain 126) of each of its child PCEs based on domain connection information that the parent PCE 101 receives from each of its child PCEs. In one embodiment, the domain connection information includes connections and access points of a domain. An access point is a network device or service (denoted by its address) in a domain that is accessible outside of the domain (e.g., Access: 10.8.8.1). A domain may contain any number of access points. For example, in FIG. 1, access point 119 in Area 122 may be a server that is configured to provide services to users outside of the Area 122. Similarly, access point 127 in Domain 126 may be a server that is configured to provide services to users outside of the Domain 126.

In one embodiment, connections include ABRs and inter-domain links of a domain. An inter-domain link connects two domains in two different ASes. In accordance with an embodiment, for a point-to-point link connecting two ASBR in two different domains (e.g., border node 102 in Domain 112 and border node 102 in Domain 114), the following information about the link may be obtained from the ASBR:
  1) Link Type: Point-to-point;
  2) Link identifier (ID) (if available);
  3) Local IP address of the link;
  4) Remote IP address of the link;
  5) Traffic engineering metric of the link;
  6) Maximum bandwidth of the link;
  7) Maximum reservable bandwidth of the link;
  8) Unreserved bandwidth of the link;
  9) Administrative group of the link; and
  10) SRLGs.

SRLGs refer to situations where links in a network share common fiber (or a common physical attribute). If one link fails, other links in the group may fail too. Links in the group have a shared risk. In one embodiment, the link ID (i.e., the Router ID of the neighbor) is not obtained unless the link ID is configured on the ASBR since no IGP adjacency over the inter-domain link is formed.

In one embodiment, for a broadcast link connecting multiple ASBRs, the following information about the link may be obtained from each ASBR:
  1) Link Type: Multi-access;
  2) Local IP address with mask length of the link;
  3) Traffic engineering metric of the link;
  4) Maximum bandwidth of the link;
  5) Maximum reservable bandwidth of the link;
  6) Unreserved bandwidth of the link;
  7) Administrative group of the link; and
  8) SRLG.

Note that for a broadcast link connecting multiple ASBRs, the information does not include a remote IP address or a link ID.

Figure 2A:
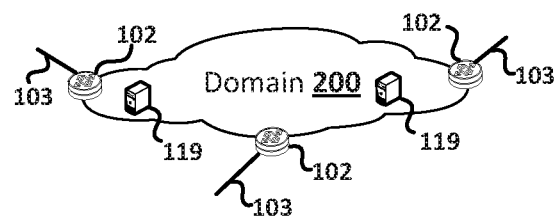
FIGS. 2A-2C are schematic diagrams illustrating abstraction of a single domain according to embodiments of the disclosure.
Figure 2B:
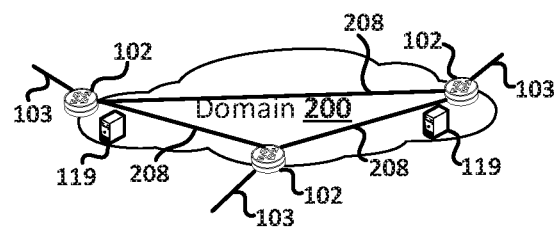
Figure 2C:
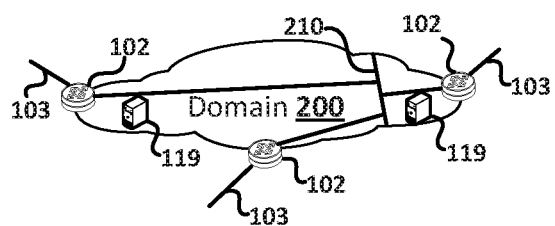

In accordance with the disclosed embodiments; a domain of a child PCE may be abstracted in various ways. For example, FIGS. 2A-2C illustrates three abstraction techniques for abstracting a single domain of a child PCE. In FIG. 2A, the Domain 200 is abstracted as a cloud. The domain connection information for this embodiment includes inter-domain links 103 between the Domain 200 and adjacent domains, and Access Point 119 of the Domain 200.

In FIG. 2B, the Domain 200 is abstracted as full mesh of the border nodes 102 of the Domain 200. The domain connection information for this embodiment includes point to point links 208 between the border nodes 102 of the Domain 200, inter-domain links 103 between the Domain 200 and adjacent domains, and Access Point 119 of the Domain 200.

In FIG. 2C, the Domain 200 is abstracted as border nodes 102 of the Domain 200 connected by a broadcast link 210. The domain connection information for this embodiment includes broadcast link 210, inter-domain links 103 between the Domain 200 and adjacent domains, and Access Point 119 of the Domain 200.

Figure 3A:
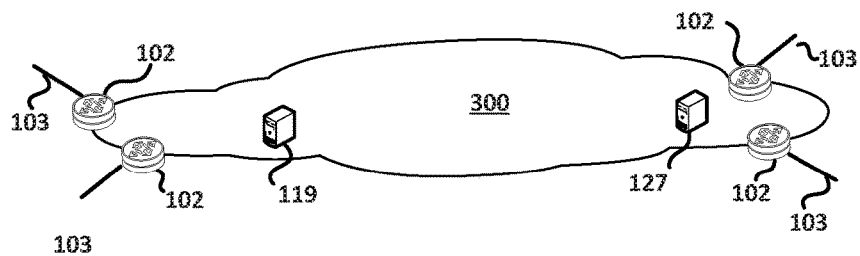
FIGS. 3A-3B are schematic diagrams illustrating abstraction of multiple domains according to embodiments of the disclosure.
Figure 3B:
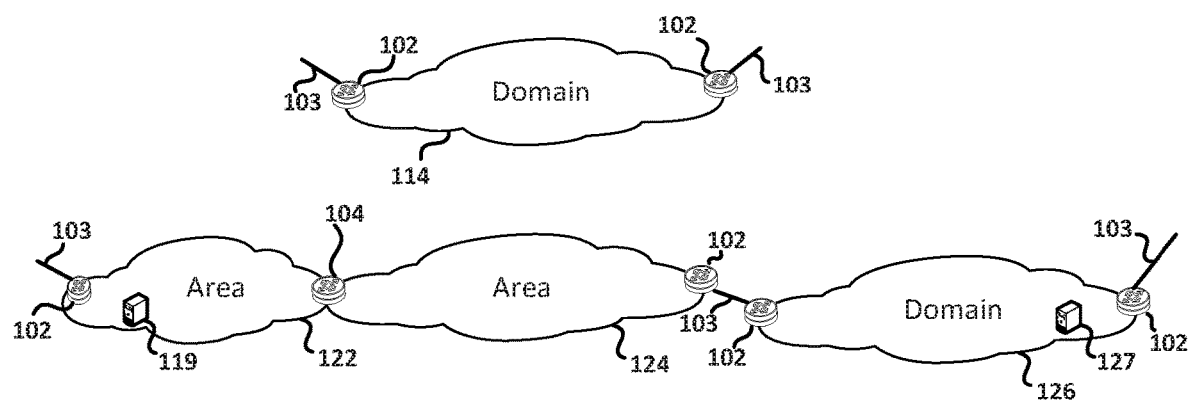

FIGS. 3A and 3B illustrate two abstraction techniques for abstracting multiple domains of a child PCE (e.g., Domain 114, Area 122, Area 124, and Domain 126 associated with child PCE 113 in FIG. 1). In a first embodiment, illustrated in FIG. 3A, the child PCE as a parent abstracts its multiple domains as a single cloud 300. In this embodiment, the domain connection information includes the inter-domain links 103 between the border nodes 102 in any of the domains of the child PCE and the border nodes 102 in adjacent external domains. The connections among its children's domains are hidden. The domain connection information also includes Access Point 119 in any of the domains of the child PCE.

In FIG. 3B, the child PCE as a parent abstracts each of its domains as a separate cloud. For example, using Domain 114, Area 122, Area 124, and Domain 126 associated with child PCE 113 in FIG. 1, the child PCE as a parent PCE sends the domain connection information for each of its domains. In this embodiment, the domain connection information includes the inter-domain links 103 between any of the domains of the child PCE and adjacent domains including inter-domain links and ABRs between the domains of the child PCE. The domain connection information also includes any access points in any of the domains of the child PCE (e.g., Access Point 119 in Area 122 and Access Point 127 in Domain 126.

In one embodiment, each child PCE advertises its connections and access points for its respective domain to its parent PCE. For example, in FIG. 1, child PCEs 111, 113, and 115 advertises its connections and access points for its respective domain to the parent PCE 101. Based on the domain connection information, the parent PCE 101 constructs or updates the domain topology. In one embodiment, the parent PCE 101 creates and maintains a traffic engineering database (TED) for the topology of the domains of each of its child PCEs.

In one embodiment, the domain connection information may be communicated from child PCEs 111, 113, and 115 to the parent PCE 101 by extending an existing PCEP notification (PCNtf) message to include new TLVs, sub-TLVs, NT, and NV in a Notification object. In one embodiment, the new TLVs are used to add extra information the message. Sub-TLVs are used to add extra information to particular TLVs.

For example, FIG. 4 is a schematic diagram illustrating new TLV extensions to existing protocol messages according to an embodiment of the disclosure. In one embodiment, the new TLV extensions include an inter-domain link TLV 410, a Router-ID TLV 420, and an access IPv4/IPv6 address prefix TLV 430.

The inter-domain link TLV 410 describes a single inter-domain link. In one embodiment, the inter-domain link TLV 410 includes a type value 412 to indicate that it's an inter-domain link TLV, a length 414 to indicate the number of bytes to read for this TLV, and inter-domain link sub-TLVs 416 that include sub-TLVs that described the inter-domain link. For example, in one embodiment, the sub-TLVs may include the link type (1 octet), link ID (4 octets), local interface IP address (4 octets), remote interface IP address (4 octets), traffic engineering metric (4 octets), maximum bandwidth (4 octets), maximum reservable bandwidth (4 octets), unreserved bandwidth (32 octets), and administrative group (4 octets).

The Router-ID TLV 420 includes a type value 422 to indicate that it's a Router-ID TLV, a length 424 to indicate the number of bytes to read for this TLV, router type flags 426, and Router-ID 428. In one embodiment, the router type flags 426 include an ABR flag (B) 421 that when set (e.g., set to 1) indicates that the router is an ABR, an ASBR flag (E) 423 that when set indicates that the router is an ASBR, and a local router flag (I) 425 that when set indicates the ID of a local router. The Router ID 428 indicates the ID of a router. In one embodiment, for a router running OSPF, the ID may be the 32-bit OSPF router ID of the router. For a router running IS-IS, the ID may be the 48-bit IS-IS router ID.

The access IPv4/IPv6 address prefix TLV 430 includes a type value 432 to indicate that it's an access IPv4/IPv6 address prefix TLV, a length 434 to indicate the number of bytes to read for this TLV, a prefix length 436 indicates the number of bits set in the subnet mask, and a IPv4/IPv6 Prefix 438 to indicate IPv4/IPv6 network prefixes that identify the range of IP addresses that make up a subnet, or group of IP addresses on the same network.

FIG. 5 is a schematic diagram illustrating new sub-TLVs extensions to protocol messages according to an embodiment of the disclosure. Sub-TLVs are TLVs that are inside TLVs such as inter-domain link TLV 410. In one embodiment, the new sub-TLVs extensions include a local IPv4 address with mask Sub-TLV 510 and a local IPv6 address with mask Sub-TLV 520. Both the local IPv4 address with mask Sub-TLV 510 and the local IPv6 address with mask Sub-TLV 520 respectively include a type value 512, 522 to indicate that it's a local IPv4 or IPv6 address with mask Sub-TLV, a length 514, 524 to indicate the number of bytes to read for this TLV, an IPv4 address 516, an IPv6 address 526 that indicates the local IPv4/IPv6 address of a link, and a mask length 518, 528 that indicates the length of the IPv4/IPv6 address mask.

FIG. 6 is a schematic diagram illustrating a PCEP notification body object 600 according to an embodiment of the disclosure. The PCEP notification body object 600 includes a reserved bit(s) 602, flags 604, a NT 606, a NV 608, and optional TLVs 610. The reserved bit(s) 602 indicates 8 bits, which are reserved for future use. In one embodiment, the flags 604 may include 8 bits, each of which may be defined in the future. In accordance with an embodiment, the NT 606 and the NV 608 fields may be used to indicate new extensions as disclosed herein. For example, a new NT value (e.g., 8) may be used to indicate that the PCEP notification body object 600 is for updating connections and accesses of a child domain. The NV 608 may be used to indicate whether an update (e.g., NV=1) or a withdrawal (e.g., NV=2) should be made. For example, in one embodiment, NT=8 and NV=1 indicates that the child PCE is sending its parent PCE updates on the information about connections and accesses of its domain, and TLVs containing the information are in the NOTIFICATION object. For example, in one embodiment, the optional TLVs 610 may include inter-domain link TLV 410, Router-ID TLV 420, and/or access IPv4/IPv6 address prefix TLV 430 in addition to other TLVs. The parent PCE will then update the TED based on the received information. Similarly, in one embodiment, NT=8 and NV=2 indicates that the child PCE is asking its parent PCE to remove connections and accesses indicated by the TLVs in the PCEP notification body object 600.

In another embodiment, instead of extending an existing PCEP notification message, the domain connection information may be communicated from child PCEs 111, 113, and 115 to the parent PCE 101 using a newly defined message comprising a new connection and access object. In one embodiment, the new connection and access object includes new object types including an inter-domain link object, an ABR object, an access Internet Protocol Version 4 (IPv4) prefix object, and an access Internet Protocol Version 6 (IPv6) prefix object.

For example, FIG. 7 is a schematic diagram illustrating a new accesses and connections (AC) message 700 according to an embodiment of the disclosure. In one embodiment, the AC message 700 is sent by a child PCE to its parent PCE to advertise the connections and accesses of a domain of the child PCE. The AC message 700 includes a Common Header object 702, a new request parameter (NRP) object 704, a Connection-List object 706, and an Access-Address-List object 708.

Figures 9, 10:
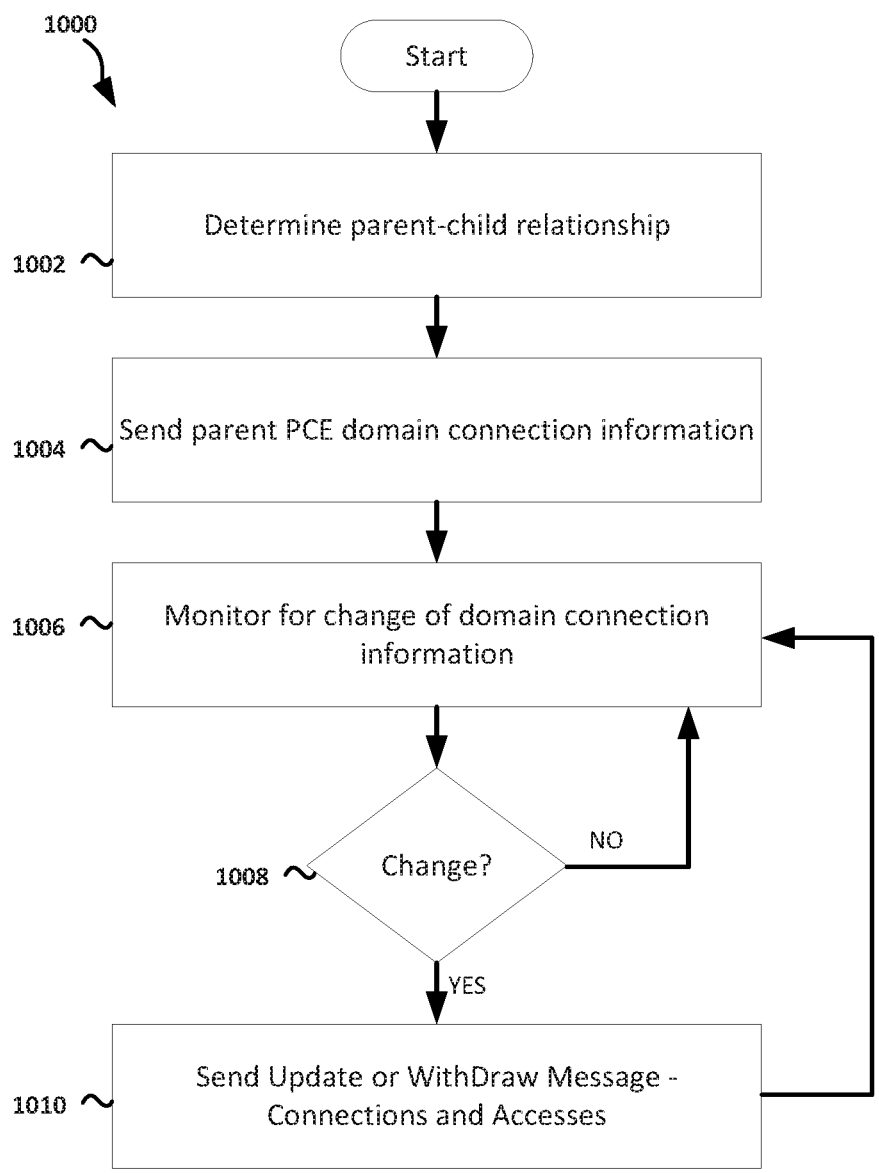
FIG. 9 is a schematic diagram illustrating a common object header according to an embodiment of the disclosure.
FIG. 10 is a flowchart illustrating a process performed on a child PCE according to an embodiment of the disclosure.

In one embodiment, a Message-Type value in the Common Header object 702 indicates the new message type. An example of a Common Header object is illustrated in FIG. 9 and described below.

The NRP object 704 is used to indicate whether connections and access points are to be updated or withdrawn. For example, in one embodiment, a new flag W (Withdraw) in the NRP object is defined to indicate whether the connections and access points are withdrawn. When flag W is set to one, the parent removes the connections and access points contained in the message after receiving it from its child. When flag W is set to zero, the parent adds/updates the connections and access points in the message after receiving it. In an alternative embodiment, a similar flag may be included in each connection and access object as illustrated in FIG. 6.

The Connection-List object 706 comprises a Connection object 710 which includes an Inter-Domain-Link object 712 and ABR object 714. The Inter-Domain-Link object 712 comprises domain connection information for the inter-domain-links of the domain associated with a child PCE. The ABR object 714 comprises domain connection information for the ABRs of the domain associated with a child PCE. The Access-Address-List object 708 comprises an Access-Address object 716 that comprises an Access-Address-List 718 containing the domain connection information for access points of the domain associated with a child PCE.

FIG. 8 is a schematic diagram illustrating newly defined object types of a connection and access (CA) object according to an embodiment of the disclosure. In one embodiment, the CA object has an Object-Class of ocTBD1. In one embodiment, four Object-Types comprising a CA Inter-Domain Link object 810, a CA ABR object 820, a CA Access IPv4 Prefix object 830, and a CA Access IPv6 Prefix object 840 are defined under the CA object as shown in FIG. 8.

In the depicted embodiment, the CA Inter-Domain Link object 810 comprises a flags 812 bit such as the W flag 811 as described above, a Router-ID TLV 814, and Inter-Domain Link TLVs 816. In one embodiment, the formats of the Router-ID TLV 814 and the Inter-Domain Link TLVs 816 are similar to that Router-ID TLV 420 and inter-domain link TLV 410 as illustrated in FIG. 4. The CA ABR object 820 comprises a flag 822 bit such as the W flag 821, and a Router-ID TLV 824. The CA Access IPv4 Prefix object 830 comprises a flag 832 bit such as the W flag 831, and an Access IPv4 Prefix TLVs 834. Similarly, the CA Access IPv6 Prefix object 840 comprises a flags 842 bit such as the W flag 841, and an Access IPv6 Prefix TLVs 844. In one embodiment, the format of Access IPv4 Prefix TLVs 834 and Access IPv6 Prefix TLVs 844 are similar to the IPv4/IPv6 address prefix TLV 430 illustrated in FIG. 4.

FIG. 9 is a schematic diagram illustrating a common object header 900 according to an embodiment of the disclosure. In the depicted embodiment, the common object header 900 comprises an object-class field 902, an object type (OT) field 904, a reserved field 906, a processing (P) flag field 908, an ignore (I) flag field 910, an object length field 912, and an object body 914. The object-class field 902 identifies the PCEP object class. In one embodiment, the object-class field 902 is 8 bits. The OT field 904 identifies the PCEP object type. In one embodiment, the OT field 904 is 4 bits. In one embodiment, the reserved field 906 is 2 bits and may be reserved for future use. In one embodiment, if not defined, the reserved bits may set to zero on transmission and ignored on receipt. In one embodiment, the P flag field 908 is 1-bit and enables a PCC to specify in a path computation request (PCReq) message sent to a PCE whether the object must be taken into account by the PCE during path computation or whether the object is optional. For example, in one embodiment, when the P flag is set, the object must be taken into account by the PCE. Conversely, when the P flag is cleared, the object is optional and the PCE is free to ignore it. In one embodiment, the I flag field 910 is used by a PCE in a path computation response (PCRep) message to indicate to a PCC whether or not an optional object was processed. In one embodiment, the object length field 912 defines the total length of the PCEP object class including the header in bytes.

FIG. 10 is a flowchart illustrating a method 1000 performed on a child PCE according to an embodiment of the disclosure. The method 1000 begins at step 1002 with the child PCE determining its parent-child relationship. For example, in one embodiment, the parent PCE and the child PCE establish a PCEP session by advertising their respective capabilities for Hierarchical PCE (H-PCE). In one embodiment, this is performed using an Open Message in accordance with PCEP during a session initialization process. In an embodiment, the Open Message may include an address or identifier of the child PCE, the domain for which the child PCE is responsible for and the position of the child PCE (e.g., a leaf position indicating the child PCE is only a child, or a branch position indicating that the child PCE is a child and also a parent). In some embodiments, the Open Message may indicate whether the child PCE and its responsible domain are in a same organization as the parent PCE. The child PCE may obtain similar information about the parent PCE including an address or identifier of the parent PCE, and whether the parent PCE is in a same organization as the child PCE. In another embodiment, the child and parent relationship can be established using a PCEP Notification message (also referred to as the PCNtf message) over an existing session.

After the child PCE determines its parent PCE, at step 1004, the child PCE sends the parent PCE a message containing the domain connection information of the child PCE, which includes the connections (i.e., inter-domain links and ABRs) from its domain to its adjacent domains and the access points in its domain.

At step 1006, the child PCE monitors for changes in the domain connection information. If the child PCE determines at step 1008 that a change occurred in the domain connection information, for any new or changed inter-domain links, ABRs and access points in the domain for which a child is responsible, the child at step 1010 sends its parent PCE a message containing the information about these links, ABRs and access points with indication to update the connections and accesses. In one embodiment, for multiple new or changed inter-domain links for an ASBR, the child PCE sends its parent PCE a message having an indication to update the connections and accesses, and the ASBR's ID followed by the detailed information about each of the links.

For any inter-domain links, ABRs and access points for which a child PCE is responsible that are down in the domain or removed from the domain, the child PCE sends its parent PCE a message containing the information about these links, ABRs and access points with an indication to withdraw the connections and accesses. In one embodiment, if multiple inter-domain links of an ASBR are down or removed, the child PCE sends its parent PCE a message having an indication to withdraw the connections and accesses, the ASBR's ID, and the ID information about each of the links.

As described above, in one embodiment, a child PCE abstracts all its domains including the domains for which its children are responsible as a single cloud. If a parent PCE (P1) is also a child PCE of another parent PCE (P2), P1 as a child PCE sends its parent PCE P2 a message containing the information about the connections and access points. P1 as a parent PCE has the connections among its children's domains. In one embodiment, these connections are hidden from its parent PCE P2. P1 may have connections from its children's domains to other domains. P1 as a child PCE sends its parent PCE P2 these connections. From P2's point of view, its child PCE P1 is responsible for one domain, which has some connections to its adjacent domains and some access points to be accessible.

Additionally, P1 as a parent PCE has the access points in its children's domains to be accessible outside of the domains. In one embodiment, P1 as child PCE may not send all the access points in its children's domains to its parent PCE P2. For instance, in one embodiment, P1 as child PCE sends its parent PCE P2 only some of these access points in accordance with local policies.

In another embodiment, as described above, the child PCE abstracts each of the domains that its children are responsible for as a cloud (or abstract node) and these clouds are connected by the inter-domain links attached to the domains. The child PCE sends its parent PCE all the inter-domain links attached to any of the domains.

In one embodiment, when a child PCE and its parent PCE are in a same organization, the child PCE may send its parent PCE the information inside its domain if it is allowed by local policies and rules, which may consider manageability, security, and scalability. For a parent PCE, after all its children in its organization send their parent PCE the information in their domains, connections and access points, the parent PCE has in its TED the detailed information inside each of its children's domains and the connections among these domains. The parent can compute a path crossing these domains directly and efficiently without sending any path computation request to its children. In addition, the parent PCE may be responsible for the domains' resource allocations.

FIG. 11 is a schematic diagram illustrating a domain 1100 associated with a child PCE according to an embodiment of the disclosure. The domain 1100 includes an ASBR 1102, an ASBR 1104, and an ABR 1106. The ASBR 1102 has a router ID of 1.1.1.1. The ASBR 1104 has a router ID of 2.2.2.2. The ABR 1106 has a router ID of 3.3.3.3. The ASBR 1102 has a P2P inter-domain link 1112 connecting the ASBR 1102 in a domain 1100 to a second ASBR in a different domain. The P2P inter-domain link 1112 has a local IP address of 10.1.1.1 and a remote IP address of 10.1.1.2. The ASBR 1104 has a broadcast link 1110 connecting the ASBR 1104 to multiple ASBRs in different domains. The broadcast link 1110 has a local IP address of 10.2.1.1/24. As noted above, a remote IP address is not available for the broadcast link 1110.

FIG. 12 is a schematic diagram illustrating an update notification object 1200 for the domain 1100 according to an embodiment of the disclosure. The update notification object 1200 is sent by a child PCE associated with the domain 1100 to a parent PCE of the child PCE. The child PCE may send the update notification object 1200 when a session is first established with the parent PCE or when a change to the connections and access points of the domain 1100 occurs. As described above, in one embodiment, the parent PCE may determine that the update notification object 1200 is a connections and accesses update notification based on new NT and NV extension values added to a PCEP notification object (e.g., NT=8 indicates that it's a connections and accesses notification, and NV=1 indicates that the connections and accesses notification is an update notification). Alternatively, as described above, in another embodiment, the update notification object 1200 may be sent to the parent PCE in the form of a new message as illustrated in the example in FIG. 7.

As shown in FIG. 12, the update notification object 1200 includes a Router-ID TLV 1202, an inter-domain link TLV 1203, Router-ID TLV 1204, an inter-domain link TLV 1205, and a Router-ID TLV 1206. The Router-ID TLV 1202 includes a router ID of ASBR 1102. The inter-domain link TLV 1203 includes a link type: P2P, a local IP address: 10.1.1.1, a remote IP address: 10.1.1.2, and a traffic engineering (TE) metric: 10. The inter-domain link TLV 1203 may also include, as indicated by ( . . . ) in FIG. 12, a maximum bandwidth, a maximum reservable bandwidth, unreserved bandwidth, an administrative group, and an SRLG. The Router-ID TLV 1204 includes a router ID of ASBR 1104. The inter-domain link TLV 1205 includes a link type: Multi-Access, a local IP address with mask length: 10.2.1.1/24, and a TE metric: 20. The inter-domain link TLV 1205 may also include, as indicated by ( . . . ) in FIG. 12, a maximum bandwidth, a maximum reservable bandwidth, unreserved bandwidth, an administrative group, and an SRLG. The Router-ID TLV 1206 includes a router ID of ABR 1106. As described in FIG. 4, in one embodiment, the Router-ID TLV 1206 may include a router type flag 1208 such as an ABR flag (B) that when set (e.g., set to 1) indicates that the router is an ABR as illustrated in FIG. 12.

FIG. 13 is a schematic diagram illustrating a withdrawal notification object 1300 for the domain in FIG. 11 according to an embodiment of the disclosure. Similar to the update notification object 1200, the withdrawal notification object 1300 may be sent to the parent PCE using new NT and NV extension values in a PCEP notification object (e.g., NT=8 indicates that it's a connections and accesses notification, and NV=2 indicates that the connections and accesses notification is a withdrawal notification) or may be sent to the parent PCE in the form of a new message as illustrated in the example in FIG. 7.

In the illustrated example, the withdrawal notification object 1300 withdraws the previous connections and access points that were updated in FIG. 12. As shown in FIG. 13, the withdrawal notification object 1300 includes a Router-ID TLV 1302, an inter-domain link TLV 1303, an inter-domain link TLV 1304, and a Router-ID TLV 1306. As shown in FIG. 13, in one embodiment, if the links are connected to the same router, then only one Router-ID TLV is needed. In the depicted embodiment, the Router-ID TLV 1302 includes a router ID of ASBR 1102. The inter-domain link TLV 1303 includes a link type: P2P, a local IP address: 10.1.1.1, a remote IP address: 10.1.1.2. In one embodiment, because the process is withdrawing these connections and access points, the inter-domain link TLV 1303 does not need to include any additional link information such as the traffic engineering metric, maximum bandwidth, maximum reservable bandwidth, unreserved bandwidth, administrative group, and SRLG that may be included in an update notification object. The inter-domain link TLV 1304 includes a link type: Multi-Access and a local IP address: 10.2.1.1/24. The Router-ID TLV 1306 includes a router ID of ABR 1106 along with a router type flag 1308 that indicates that the router is an ABR.

FIG. 14 is a flowchart illustrating a process 1400 performed on a parent PCE according to an embodiment of the disclosure. Similar to FIG. 10, the process 1400 begins at step 1402 with the parent PCE determining the parent-child relationships with other PCEs as described above (e.g., by advertising via PCEP Open Message during a session initialization process or by using PCNtf message over an existing session).

After establishing the parent-child relationships, the parent PCE receives the domain connection information from its child PCEs at step 1404. At step 1406, the parent builds the PCE domain topology. For example, in one embodiment, the parent PCE stores into its TED the connections and accesses for each of its children's domains according to the messages containing connections and accesses received. In one embodiment, each of the domains is seen as a cloud or an abstract node, and the information inside each of the domains is hidden from the parent PCE.

The parent PCE at step 1408 monitors for an update or withdrawal connections and access message. At step 1410, the parent PCE determines whether an update or withdrawal connections and access message is received (e.g., based on reading the new NT and NV extension values). If an update or withdrawal connections and access message is received, the parent PCE at step 1412 modifies the domain topology in the TED based on the domain connection information in the update or withdrawal message. For instance, for a message containing update connections and accesses, the parent PCE updates the connections and accesses in the TED accordingly. For a message containing withdraw connections and accesses, the parent PCE removes the connections and accesses from the TED. Thus, the parent PCE maintains in the TED the connections among the domains and the access points in the domains to be accessible in the topology.

In one embodiment, for a new P2P link from node A to B with no link ID configured, when receiving a message containing the link from a child PCE, the parent PCE stores the link from A into its TED, where A is attached to the child PCE's domain as a cloud. The parent PCE then determines the link's remote end B using the remote IP address of the link. After determining B, the parent PCE associates the link attached to A with B and the link attached to B with A. This creates a bidirectional connection between A and B. For a new P2P link from node A to B with link ID configured, when receiving a message containing the link, the parent PCE stores the link from A into its TED. The parent PCE then determines the link's remote end B using the link ID (i.e., B's ID).

In one embodiment, for a new broadcast link connecting multiple nodes with no link ID configured, when the parent PCE receives a message containing the link attached to node X, the parent PCE stores the link from X into its TED. The parent PCE determines the link's remote end P using the link's local IP address with network mask. P is a Pseudo node identified by the local IP address of the designated node selected from the nodes connected to the link. After determining P, the parent PCE associates the link attached to X with P and the link connected to P with X. If P is not determined, a new Pseudo node P is created. The parent PCE associates the link attached to X with P and the link attached to P with X. This creates a bidirectional connection between X and P.

In one embodiment, the first node and second node from which the parent PCE receives a message containing the link is selected as the designated node and backup designated node respectively. After the designated node is down, the backup designated node becomes the designated node and the node other than the designated node with the largest local IP address connecting to the link is selected as the backup designated node. When the old designated node is down and the backup designated node becomes the new designated node, the parent PCE updates its TED by removing the link between each of nodes X and old P (the Pseudo node corresponding to the old designated node) and adding a link between each of nodes X (still connecting to the broadcast link) and new P (the Pseudo node corresponding to the new designated node).

In one embodiment, if a parent PCE is in a same organization as its child PCE, the parent PCE stores into its TED the detailed information inside the child PCE's domain when receiving a message containing the information from the child PCE. Otherwise, the parent PCE discards the information and issues a warning indicating that the information is sent to a wrong place.

Figure 15:
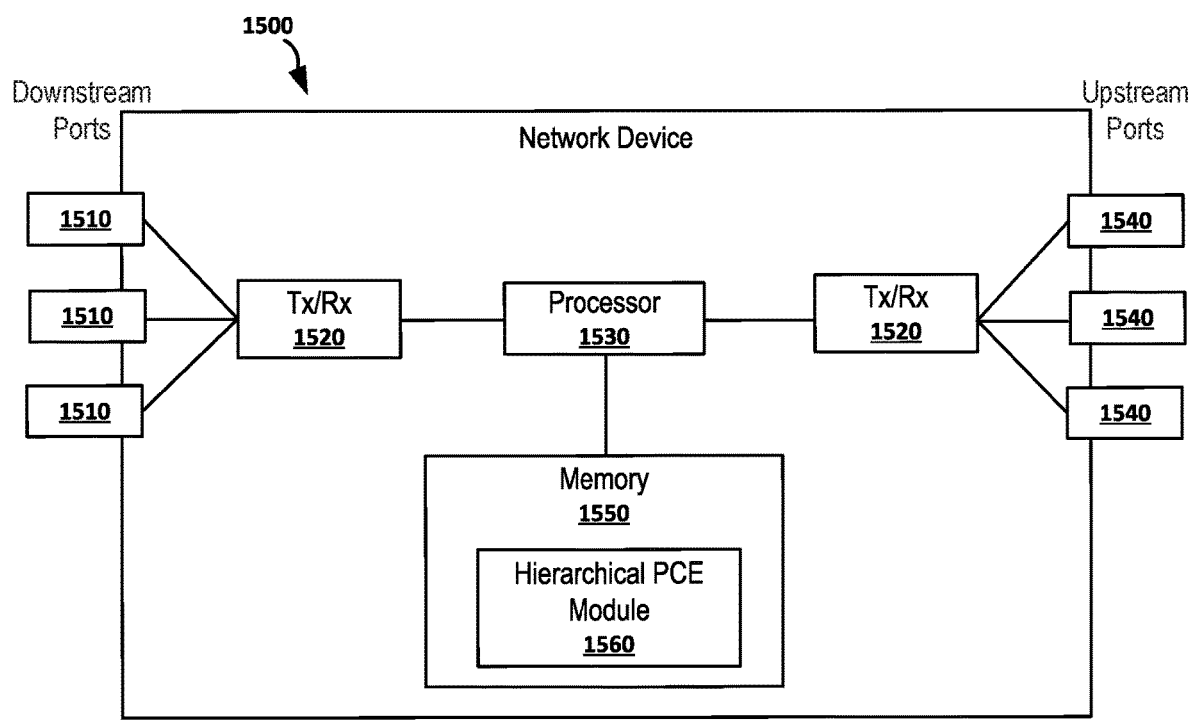
FIG. 15 is a schematic diagram illustrating a network device in accordance with an embodiment of the disclosure.

FIG. 15 is a schematic diagram illustrating an example of a network device 1500 that may be deployed in accordance with an embodiment of the disclosure. In one embodiment, the network device 1500 may be a parent PCE as illustrated in FIG. 1 and be configured to perform the process described herein for building and maintaining a hierarchy PCE topology. In another embodiment, the network device 1500 may be a child PCE as illustrated in FIG. 1 and be configured to transmit its domain connection information to a parent PCE as disclosed herein.

The network device 1500 comprises one or more downstream ports 1510 coupled to a transceiver (Tx/Rx) 1520, which comprise transmitters, receivers, or combinations thereof. The Tx/Rx 1520 transmits and/or receives frames from other network nodes via the downstream ports 1510. Similarly, the network device 1500 comprises another Tx/Rx 1520 coupled to a plurality of upstream ports 1540, wherein the Tx/Rx 1520 transmits and/or receives frames from other nodes via the upstream ports 1540. The downstream ports 1510 and/or the upstream ports 1540 include electrical and/or optical transmitting and/or receiving components. In another embodiment, the network device 1500 comprises one or more antennas coupled to the Tx/Rx 1520. The Tx/Rx 1520 transmits and/or receives data (e.g., packets) from other network elements via wired or wireless connections, depending on the embodiment.

A processor 1530 is coupled to the Tx/Rx 1520 and is configured to process the incoming data and/or determine to which nodes to send (e.g., transmit) the data. In an embodiment, the processor 1530 comprises one or more multi-core processors and/or memory modules 1550, which function as data stores, buffers, etc. The processor 1530 is implemented as a general processor or as part of one or more application specific integrated circuits (ASICs), field-programmable gate arrays (FPGAs), and/or digital signal processors (DSPs). Although illustrated as a single processor, the processor 1530 is not so limited and may comprise multiple processors. The processor 1530 is configured to communicate and/or process multi-destination frames.

FIG. 15 illustrates that a memory module 1550 is coupled to the processor 1530 and is a non-transitory medium configured to store various types of data and/or instructions. Memory module 1550 comprises memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage is used to store programs which are loaded into the RAM when such programs are selected for execution. The ROM is used to store instructions and perhaps data that are read during program execution. The ROM is a non-volatile memory device which typically has a small memory capacity relative to the larger memory capacity of the secondary storage. The RAM is used to store volatile data and perhaps to store instructions. Access to both the ROM and RAM is typically faster than to the secondary storage.

The memory module 1550 is used to house the instructions for carrying out the various embodiments described herein. For example, in one embodiment, the memory module 1550 comprises a hierarchical PCE module 1560 comprising instructions and other data that when executed by the processor 1530 performs the processes described herein for constructing an abstract domain topology.

It is understood that by programming and/or loading executable instructions onto the network device 1500, at least one of the processors 1530, the cache, and the long-term storage are changed, transforming the network device 1500 in part into a particular machine or apparatus, for example, a parent PCE or child PCE having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and will be produced in large volume may be preferred to be implemented in hardware (e.g., in an ASIC) because for large production runs the hardware implementation may be less expensive than software implementations. Often a design may be developed and tested in a software form and then later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), compact disc read-only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM, flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Although FIG. 15 depicts a particular hardware embodiment for implementing the features described herein, it should be understood that the disclosed embodiments are not limited to any particular hardware architecture and may be implemented in devices having varying hardware architecture or components.

Accordingly, the inventive concepts disclosed herein provide an efficient method for maintaining a hierarchical PCE domain topology based on domain connection information that the parent PCE receives from its child PCEs. Advantages of the disclosed embodiments include increase network resource efficiency usage, reduction in the overall network capital expenditure (CapEx) and operating expenditure (OpEx), and the facilitation of deployment of services and enabling new features along with other benefits.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein. Therefore, the specification and drawings are to be regarded simply as an illustration of the disclosure as defined by the appended claims, and are contemplated to cover any and all modifications, variations, combinations or equivalents that fall within the scope of the present disclosure.

What is claimed is:

1. A method for constructing an abstract domain topology, the method comprising:
    configuring a first path computation element (PCE) as a parent PCE to at least one child PCE, wherein each of the at least one child PCE is responsible for a domain;
    establishing communication between the parent PCE and the at least one child PCE, wherein a child PCE is configured as a second parent PCE to a second set of child PCEs comprising at least one child PCE, wherein each child PCE in the second set of child PCEs is responsible for a second domain;
    receiving, by the parent PCE, domain connection information corresponding to the domain of each of the at least one child PCE, wherein the domain connection information comprises the domain connection information corresponding to the second domain of each child PCE in the second set of child PCEs; and
    constructing, by the parent PCE, the abstract domain topology based on the domain connection information.

2. The method of claim 1, wherein the domain connection information excludes inter-domain links and area border routers (ABRs) that connect between the second domains associated with the second set of child PCEs.

3. The method of claim 1, wherein the domain connection information for the domain of each of the at least one child PCE is communicated by each of the at least one child PCE to the parent PCE using a newly defined message comprising a new connection and access object that includes new object types comprising an inter-domain link object, an area border router (ABR) object, an access Internet protocol version 4 (IPv4) prefix object, and an access Internet protocol version 6 (IPv6) prefix object.

4. The method of claim 1, wherein the domain connection information comprises a domain identifier of the domain of a child PCE, inter-domain links and area border routers (ABRs) of the domain of the child PCE to adjacent domains, and wherein the domain connection information comprises access points within the domain of the child PCE.

5. The method of claim 4, wherein the inter-domain links include point-to-point (P2P) links connecting two autonomous system border routers (ASBRs) in two different domains, and broadcast links connecting multiple ASBRs in a number of domains.

6. The method of claim 5, wherein the domain connection information for the P2P links comprises a link type, a local Internet Protocol (IP) address, a remote IP address, a traffic engineering metric, a maximum bandwidth, a maximum reservable bandwidth, an administrative group, and shared risk link groups (SRLG).

7. The method of claim 5, wherein the domain connection information for the broadcast links comprises a link type, a local Internet Protocol (IP) address with mask length, a traffic engineering metric, a maximum bandwidth, a maximum reservable bandwidth, an administrative group, and shared risk link groups (SRLG).

8. The method of claim 1, wherein the domain connection information for the domain of each of the at least one child PCE is communicated by each of the at least one child PCE to the parent PCE by extending a path computation element communication protocol (PCEP) notification message to include a new notification-type (NT) and notification-value (NV) of a notification object in the PCEP notification message.

9. The method of claim 8, wherein the NV indicates whether connections and access points indicated by type-length-values (TLVs) in the notification object within the PCEP notification message are to be updated or withdrawn.

10. The method of claim 9, wherein four TLVs are defined for the connections and access points, and wherein the four TLVs comprise a domain link TLV, Router-ID TLV, access Internet protocol version version 4 (IPv4) prefix TLV, and access Internet protocol version 6 (IPv6) prefix TLV.

11. A method for constructing an abstract domain topology, the method comprising:
configuring a path computation element (PCE) as a child PCE to a parent PCE;
establishing communication between the child PCE and the parent PCE, wherein the child PCE is configured as a second parent PCE to a second chi ld PCE associated with a second domain; and
sending, by the child PCE, domain connection information correspondingto a domain of the child PCE to the parent PCE, wherein-the domain connection information is communicated by the child PCE to the parent PCE by extending a path computation element communication protocol (PCEP) notification message to include a new notification-type (NT) and notification-value (NV) of a notification object in the PCEP notification message, wherein the domain connection information communicated to the parent PCE by the child PCE comprises the domain connection information correspondingto the second domain of the second child PCE, and wherein the domain connection information for the domain of the child PCE and the second domain of the second child PCE is abstracted as a single cloud.

12. The method of claim 11, wherein the NV indicates whether connections and access points indicated by type-length-values (TLVs) in the notification object within the PCEP notification message are to be updated or withdrawn.

13. The method of claim 12, wherein the domain connection information comprises a domain identifier of the domain of the child PCE, inter-domain links and area border routers (ABRs) of the domain of the child PCE to adjacent domains, and wherein the domain connection information comprises access points within the domain of the child PCE.

14. The method of claim 13, wherein the inter-domain links include point-to-point (P2P) links and broadcast links, wherein the P2P links connect an autonomous system border router (ASBR) in the domain of the child PCE and a second ASBR in a different domain, and wherein the broadcast links connect the ASBR in the domain of the child PCE to multiple ASBRs in a number of different domains.

15. The method of claim 14, wherein the domain connection information for the P2P links comprises a link type, a local Internet Protocol (IP) address, a remote IP address, a traffic engineering metric, a maximum bandwidth, a maximum reservable bandwidth, an administrative group, and shared risk link groups (SRLG).

16. The method of claim 14, wherein the domain connection information for the broadcast links comprises a link type, a local Internet Protocol (IP) address with mask length, a traffic engineering metric, a maximum bandwidth, a maximum reservable bandwidth, an administrative group, and shared risk link groups (SRLG).

17. A path computation element (PCE) device comprising:
a network interface for enabling communications over a network;
memory for storing executable instructions;
a processor configured to execute the executable instructions to:
configure the PCE as a parent PCE to a child PCE, wherein the child PCE is responsible fora domain, wherein the child PCE is configured as a second parent PCE to a second child PCE associated with a second domain;
establish communication between the parent PCE and the child PCE;
receive domain connection information correspondingto the domain of the child PCE, wherein the domain connection information is received in a path computation element communication protocol (PCEP) notification (PCNtf) message that includes a new notification-type (NT) and notification-value (NV) in a notification object, wherein the domain connection information communicated to the parent PCE by the child PCE comprises the domain connection information correspondingto the second domain of the second child PCE, and wherein the domain connection information for the domain of the child PCE and the second domain of the second child PCE is abstracted as a single cloud;
identify that the PCNtf message includes the domain connection information based on the NT and the NV values in the notification object; and update-an abstract domain topology based on the domain connection information.

* * * * *

UNITED STATES PATENT AND TRADEMARK OFFICE
CERTIFICATE OF CORRECTION

PATENT NO. : 10,728,098 B2
APPLICATION NO. : 15/602243
DATED : July 28, 2020
INVENTOR(S) : Chen Page 1 of 2

It is certified that error appears in the above-identified patent and that said Letters Patent is hereby corrected as shown below:

On the Title Page

Page 2, Column 2, Lines 21-23, should read:
Gredler, H., et.al., "North-Bound Distribution of Link-State and Traffic Engineering (TE) Information Using BGP," RFC 7752, Mar. 2016, 48 pages.

In the Claims

Column 17, Lines 14-36, Claim 11, should read:
11. A method for constructing an abstract domain topology, the method comprising:
    configuring a path computation element (PCE) as a child PCE to a parent PCE;
    establishing communication between the child PCE and the parent PCE, wherein the child PCE is configured as a second parent PCE to a second child PCE associated with a second domain; and
    sending, by the child PCE, domain connection information corresponding to a domain of the child PCE to the parent PCE, wherein the domain connection information is communicated by the child PCE to the parent PCE by extending a path computation element communication protocol (PCEP) notification message to include a new notification-type (NT) and notification-value (NV) of a notification object in the PCEP notification message, wherein the domain connection information communicated to the parent PCE by the child PCE comprises the domain connection information corresponding to the second domain of the second child PCE, and wherein the domain connection information for the domain of the child PCE and the second domain of the second child PCE is abstracted as a single cloud.

Column 18, Lines 16-48, Claim 17, should read:
17. A path computation element (PCE) device comprising:
    a network interface for enabling communications over a network;
    memory for storing executable instructions;
    a processor configured to execute the executable instructions to:

Signed and Sealed this
First Day of September, 2020

Andrei Iancu
*Director of the United States Patent and Trademark Office* configure the PCE as a parent PCE to a child PCE, wherein the child PCE is responsible for a domain, wherein the child PCE is configured as a second parent PCE to a second child PCE associated with a second domain;

establish communication between the parent PCE and the child PCE;

receive domain connection information corresponding to the domain of the child PCE, wherein the domain connection information is received in a path computation element communication protocol (PCEP) notification (PCNtf) message that includes a new notification-type (NT) and notification-value (NV) in a notification object, wherein the domain connection information communicated to the parent PCE by the child PCE comprises the domain connection information corresponding to the second domain of the second child PCE, and wherein the domain connection information for the domain of the child PCE and the second domain of the second child PCE is abstracted as a single cloud;

identify that the PCNtf message includes the domain connection information based on the NT and the NV values in the notification object; and update an abstract domain topology based on the domain connection information.